United States Patent [19]

Bauwerker

[11] Patent Number: 5,275,374
[45] Date of Patent: Jan. 4, 1994

[54] DISC VALVE WITH PROTECTED OPEN DISC

[75] Inventor: Alfred Bauwerker, Hattingen, Fed. Rep. of Germany

[73] Assignee: Adams GmbH & Co. Armaturen KG, Herne, Fed. Rep. of Germany

[21] Appl. No.: 988,051

[22] Filed: Dec. 9, 1992

[30] Foreign Application Priority Data

Sep. 5, 1992 [DE] Fed. Rep. of Germany ....... 4229783

[51] Int. Cl.$^5$ .............................................. F16K 1/22
[52] U.S. Cl. ................................................. 251/305
[58] Field of Search ........................................ 251/305

[56] References Cited

U.S. PATENT DOCUMENTS 1,824,168  9/1931  Orton .
4,527,771  7/1985  Yeary .

Primary Examiner—John C. Fox
Attorney, Agent, or Firm—Townsend and Townsend Khourie and Crew

[57] ABSTRACT

A shield for the sealing surface of a pivotable disc of a disc valve faces in an upstream direction to protect the sealing surface against wear and tear from a fluid medium streaming through the valve, particularly a hot fluid medium with abrasive particles suspended in it. The protective shield has the same thickness as the disc, is aligned with the disc when the latter is in its open position, and is located just upstream of the disc. Its ends are secured to the valve housing, and the protective shield is preferably shaped so that it generates minimal back pressure in the fluid medium such as by forming the side of the shield facing in the upstream direction as a wedge.

8 Claims, 1 Drawing Sheet

DISC VALVE WITH PROTECTED OPEN DISC

BACKGROUND OF THE INVENTION

This invention relates to disc valves of the type which have a cylindrical housing through which a gaseous or liquid fluid medium flows. A disc is mounted to the housing for pivotal movements about an axis that is transverse to the flow direction through the housing. In a closed position the disc traverses the cross-section of the housing, and cooperating sealing surfaces on the disc and the housing establish a seal between an upstream and a downstream side of the housing. In the open position the disc lies in a plane that is substantially parallel to the fluid flow direction through the housing. A suitable driving mechanism is also provided on such valves for pivotally moving the disc between its closed and open positions. Disc valves of this kind are available in a variety of configurations. Common to all such valves is that when the valve disc is open, and therefore parallel to the flow direction, a seal ring or sealing surface on the side of the disc (relative to its pivot axis) facing in an upstream direction is subjected to substantial wear and tear. The sealing surfaces are particularly stressed when abrasive particles are suspended in a hot fluid medium, since they can damage the sensitive sealing surface on the disc.

SUMMARY OF THE INVENTION

The present invention provides a protection for the sealing surfaces of open valve discs against damage from the fluid medium, and any abrasive particles suspended therein, flowing past them.

According to the present invention, this is achieved by protecting the upstream side of the open disc with a relatively narrow shield which extends across the housing just upstream of and in alignment with the disc. The shield has a width which substantially conforms to that of the open disc. It is preferably contoured to follow the peripheral contour of the disc, and its ends are suitably attached to the housing.

The purpose for the shield is to form a protective umbrella for the sealing surface which protects it against the fluid flowing towards it so that the valve disc, when open, is effectively in the flow shadow of the shield. This results in a significant increase in the service life for the sealing surface and therewith enhances the reliable closing and sealing of the valve disc in operation.

In one embodiment of the invention, it is advantageous to attach the disc protecting shield to the inside of the valve housing by welding. Alternatively, for example if the housing is cast, the protective shield can be a part of the original casting.

The protective shield preferably has the shape of a crescent which lies in the plane of the open disc. A minimal gap of a preferably constant width is maintained between the protective shield and the sealing periphery of the disc valve.

In a preferred embodiment, the protective shield is given a flow dynamically advantageous shape by forming the side of the shield facing in the upstream direction as a wedge which increases in thickness in a downstream direction. This aspect of the invention provides the further advantage that pressure drop through the valve is decreased in comparison to pressure drops through like valves without the protective shield of the present invention.

To increase the service life of the protective shield, it is helpful to apply an abrasion-resistant material, such as the one available in the market under the mark Stellit, to the surface of the shield facing the fluid flow through the valve. This substantially increases the service life of the valve, even when the fluid flow subjects it to extreme conditions, as compared to the service life attainable with valves without the sealing shield of the present invention.

DETAILED DESCRIPTION OF THE PREFERRED EMBODIMENTS

Figure 1:
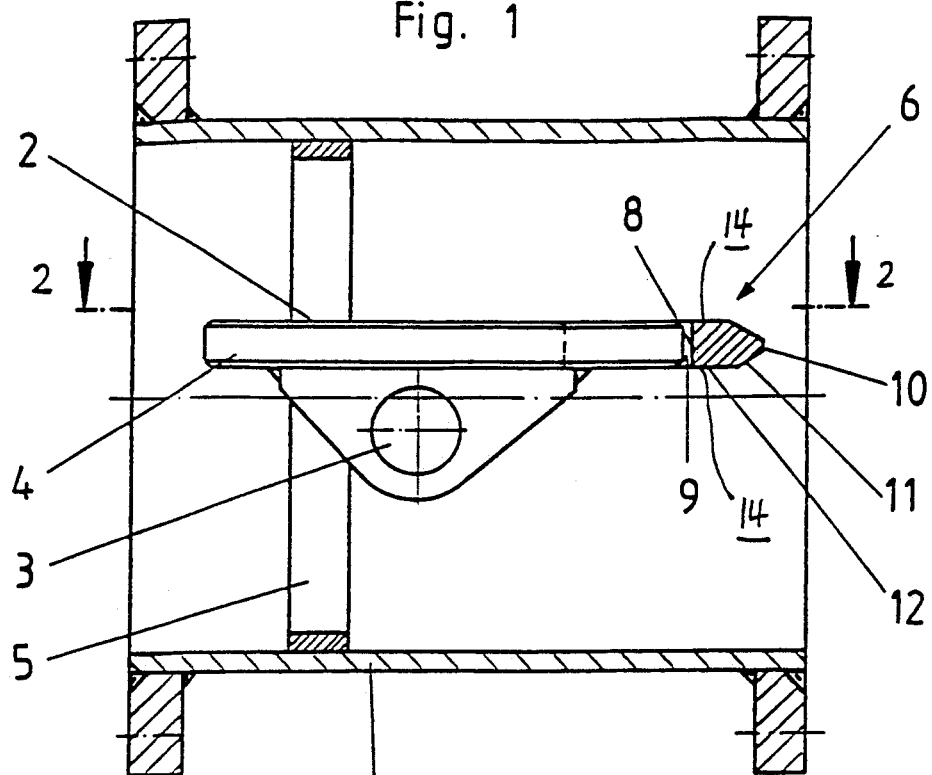
FIG. 1 is a side elevational view, in section, through a disc valve fitted with a protective shield for the open disc constructed in accordance with the present invention.
Figure 2:
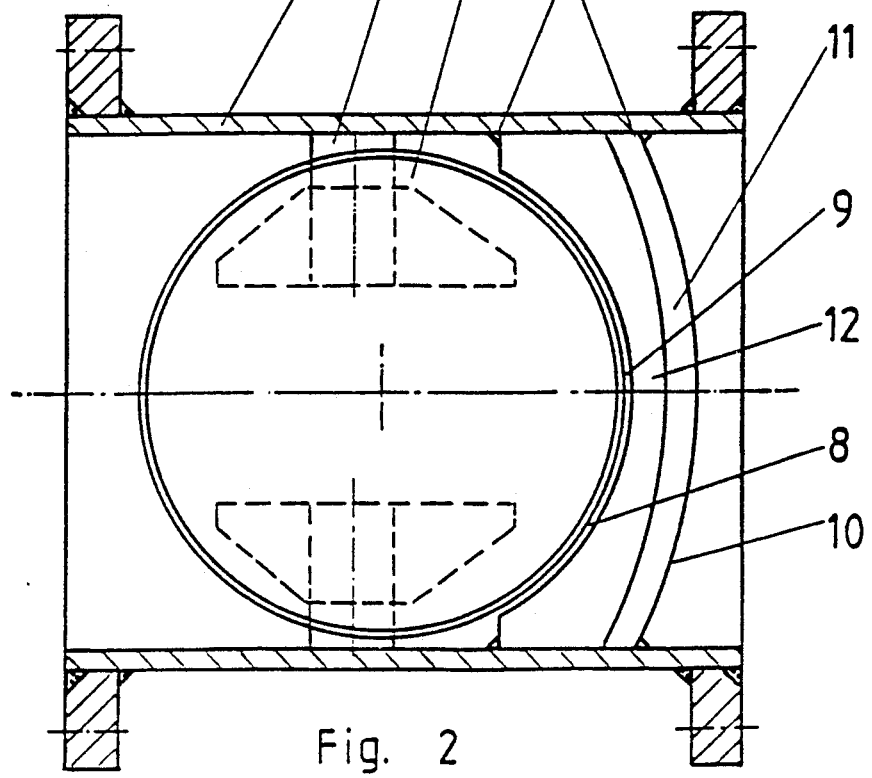
FIG. 2 is a plan view, in section, of the valve illustrated in FIG. 1 and is taken on line 2—2 of FIG. 1.

Referring to the drawings, a disc valve constructed in accordance with the present invention comprises a housing 1 which defines a flow passage for a fluid medium having a circular cross-section. The disc valve includes a valve disc 2 which is nonrotatably secured to a pivot shaft 3. The pivot shaft in turn is rotatably mounted to the housing, and by pivoting it in one or the other direction the disc can be moved between its closed position (in which the disc is transverse to the flow passage) and open position (in which the disc is substantially parallel to the flow passage as shown in FIG. 1). In the illustrated embodiment, the circular circumference of disc 2 also forms a sealing surface 4 which cooperates with sealing surface 5 in housing 1 when the disc is in its closed position. If desired, a special seal ring defining a peripheral sealing surface can be mounted to the circumference of valve disc 2.

As is best illustrated in FIG. 1, when disc 2 is in its open position a fixed protective shield 6 aligned with the open valve disc is positioned immediately upstream thereof. The ends of the protective shield 6 are secured to housing 1 with weld 7.

Protective shield 6 has a crescent shape and an inner, concave surface 8 which has a form complementary to the circular shape of valve disc 2 and which is spaced therefrom by a gap 9 of minimal (e.g. 2 mm) and preferably constant width. An outer edge 10 of protective shield 6 is convexly arcuate but has a larger radius of curvature than the inner concave surface.

In cross-section, the outer edge 10 of protective shield 6 is defined by a wedge-shaped section 11. It is followed, in the downstream direction, by a segment 12 of constant thickness which defines parallel surfaces 14 facing upwardly and downwardly, as seen in FIG. 1. The thickness of the shield segment with the parallel surfaces is preferably at least equal to the thickness of valve disc 2 to assure a good protection of the disc.

For enhanced wear resistance, it is preferred to cover the upstream-facing side of protective shield 6; that is, primarily in the area of the wedge-shaped segment 11, with a material having high wear resistance such as the earlier-mentioned Stellit.

What is claimed is:

1. A disc valve comprising:
 a housing defining a flow passage for a fluid medium in a downstream direction through the housing;

a valve disc pivotally mounted to the housing, disposed in the flow passage and pivotable between a closed position, in which the disc is oriented transversely to the flow passage, and an open position, in which the disc is substantially parallel to the flow direction, the disc including means defining a sealing surface at a periphery of the disc; and a protective shield extending across the flow passage and having respective ends secured to the housing, a thickness corresponding substantially to a thickness of the disc, and shape corresponding to a peripheral contour of the disc, the shield being further arranged in the housing so that it is in substantial alignment with an upstream-facing segment of the periphery of the disc when the disc is in its open position, the protective shield including an exterior surface facing in the upstream direction, and including a layer of a material having high wear resistance applied to the upstream-facing surface of the protective shield.

2. A disc valve according to claim 1 including welds securing the protective shield to an inner surface of the housing.

3. A disc valve according to claim 1 wherein the protective shield has a crescent shape and lies in a plane in the flow passage corresponding to a plane of the disc when it is in its open position, and wherein the protective shield defines a minimal gap of substantially constant width between the periphery of the disc and the protective shield.

4. A disc valve according to claim 1 wherein a side of the protective shield facing in an upstream direction has a wedge-shaped cross-section defined by sides which diverge in an downstream direction.

5. A disc valve comprising:

a housing forming a flow passage therethrough and defining a first sealing surface;

a disc disposed in the flow passage having a generally circular periphery and a second sealing surface shaped to sealingly engage the first sealing surface;

means mounted to the housing for pivotally moving the disc about an axis traversing the flow passage between a closed position, in which the second sealing surface cooperates with the first sealing surface to form a seal between an upstream side and a downstream side of the disc and an open position in which the disc is substantially parallel to an axis of the flow passage; and protective means mounted to the housing, traversing the flow passage on an upstream side of the closed disc and positioned so that it protects the second sealing surface from being directly exposed to the fluid medium flow through the valve and thereby protecting it against wear and tear from the fluid medium, and particles suspended therein, streaming past it, the protective means including a concave surface shaped complementary to and minimally spaced from the periphery of the disc, the protective means including a convexly shaped, upstream facing surface having a radius of curvature greater than a radium of curvature of the concave surface.

6. A disc valve according to claim 5 wherein the protective means has a thickness at least about equal to a thickness of the disc.

7. A disc valve according to claim 5 wherein the disc, when in its open position, and the protective means lie in a common plane traversing the flow passage. by first and second surfaces which converge in an upstream direction to minimize a back pressure in the fluid medium generated by the protective means.

8. A disc valve according to claim 5 wherein the protective means includes an upstream facing surface defined by first and second surfaces which converge in an upstream direction to minimize a back pressure in the fluid medium generated by the protective means.

* * * * *